United States Patent
Hetherington et al.

(10) Patent No.: US 7,325,290 B2
(45) Date of Patent: Feb. 5, 2008

(54) METHOD OF MANUFACTURING VIBRATION AND NOISE REDUCTION ASSEMBLY

(75) Inventors: Ray C. Hetherington, Virginia Beach, VA (US); James D. Jones, Jr., Barrington, IL (US); Mark K. Conlee, Suffolk, VA (US); Todd L. Tesky, Plymouth, WI (US); Vishal M. Shah, Troy, MI (US)

(73) Assignee: Illinois Tool Works Inc., Glenview, IL (US)

( * ) Notice: Subject to any disclaimer, the term of this patent is extended or adjusted under 35 U.S.C. 154(b) by 496 days.

(21) Appl. No.: 11/008,044

(22) Filed: Dec. 9, 2004

(65) Prior Publication Data

US 2005/0244617 A1  Nov. 3, 2005

Related U.S. Application Data

(60) Provisional application No. 60/566,730, filed on Apr. 30, 2004.

(51) Int. Cl.
 *B23P 25/00* (2006.01)
(52) U.S. Cl. .......... 29/458; 29/463; 29/469.5; 29/525.13; 29/525.14; 428/548; 428/615; 156/325
(58) Field of Classification Search ............ 29/458, 29/463, 469.5, 525.01, 525.13, 525.14, 527.2; 428/548, 615; 156/291, 325, 331.1
See application file for complete search history.

(56) References Cited

U.S. PATENT DOCUMENTS

| | | | |
|---|---|---|---|
| 2,452,805 A * | 11/1948 | Sussenbach | 252/510 |
| 3,540,116 A * | 11/1970 | Bohnsack et al. | 29/430 |
| 3,692,335 A | 9/1972 | Vickers et al. | |
| 4,851,271 A | 7/1989 | Moore, III et al. | 428/34.5 |
| 5,271,142 A | 12/1993 | Moore, III et al. | 29/469.5 |
| 6,167,609 B1 * | 1/2001 | Marinelli et al. | 29/469.5 |
| 6,935,009 B2 * | 8/2005 | Salameh | 29/469.5 |
| 7,200,932 B2 * | 4/2007 | Wade | 29/888.3 |
| 2003/0000063 A1* | 1/2003 | Tsegga et al. | 29/469.5 |
| 2005/0136282 A1* | 6/2005 | Morales et al. | 428/613 |

* cited by examiner

Primary Examiner—Jermie E. Cozart
(74) Attorney, Agent, or Firm—Mark W. Croll; Paul F. Donovan

(57) ABSTRACT

A method is disclosed for manufacturing a multi-part component that dampens vibration and noise caused by forces acting on the component. A pre-formed first part is treated for application of a resilient material. The material is dissolved in a solvent and is selectively applied to areas of the first part that are subject to strong forces. A second part is mechanically attached to the first part, and the entire component is cured so that the resilient material is cured, the solvent is evaporated and the parts are bonded together.

7 Claims, 3 Drawing Sheets

METHOD OF MANUFACTURING VIBRATION AND NOISE REDUCTION ASSEMBLY

CROSS REFERENCE TO PROVISIONAL APPLICATION

This Application claims priority under 35 U.S.C. § 119(e) to and incorporates by reference U.S. application Ser. No. 60/566,730, filed on Apr. 30, 2004 and entitled "Vibration and Noise Reduction Assembly."

BACKGROUND OF THE INVENTION

The present invention pertains to a method for manufacturing a multi-part component so that it dampens vibration and noise when it is subject to forces.

There are many multi-part components that are used in applications which subject the components to forces and, thus, cause the components to vibrate or make noise. Common examples include the use of multi-sheet laminate steel parts in vehicles and commercial airplanes.

With respect to vehicles, a major concern has been noise and vibration in the passenger compartment caused by the vibration energy of different systems in the vehicle, such as engine, power train and climate control systems. In particular, components such as oil pan assemblies, cam covers and front covers are subjected to various forces that cause noise and vibration. For example, in oil pan assemblies, the configuration of a windage tray and other associated components of the pan assembly and their proximity to the engine often cause the assembly to vibrate. As a result, undesirable noise and vibration (in the form of waves) travel to the interior of the vehicle, which can cause discomfort. Attempts have been made to dampen the noise and vibration in order to provide high-quality vehicles that remain quiet, promoting increased customer satisfaction.

In one known method, a rubber material is positioned between two sheets of metallic material, and the sheets of metal and rubber material are rolled together to form a sandwich (metal-rubber-metal) or laminate material. The laminate is then stamped and cut into a desired shape.

One problem with this known method, is that it results in inadequate support and a wastage of material. To dampen vibration and noise, the rubber need only be applied to strategic areas of the part. In some areas, primarily the perimeter and close to ribs formed in the part, more rubber is required. More rubber is required along the perimeter because it is at these locations that much of the vibrational forces are generated by the momentum of the component. The known method of manufacturing a multi-part component uses an equal amount of rubber material throughout the part providing little control over the amount of rubber material used in different areas. As a result, too much rubber material is used where it is not needed and insufficient material is used where it is most needed, e.g., the perimeter.

Moreover, when the component manufactured using the known method is used in assemblies that are exposed to oil, additional problems arise. The rubber material used between the sheets is typically a thermoplastic material that is spongy, and is made from a urethane matrix. The spongy material is inadequately oil resistant, temperature resistant and compression set resistant and, as a result, is susceptible to decomposing upon exposure to oil. Vibrational dampening capabilities are, therefore, compromised.

Further, to ensure that the metal sheet that is held together with the rubber material remains aligned and connected, holes or slots are formed within the sheets. The rubber material protrudes into the holes or slots to help maintain alignment and connection. But, when used in applications having exposure to oil, the rubber material decomposes and the oil seeps through the holes or slots, again, compromising the integrity of the structure.

Accordingly, there exists a need for an improved method for manufacturing multi-part components that can dampen vibration and noise caused by exposure to forces. Desirably, the improved method allows for improved manufacturing efficiency while still providing improved dampening.

BRIEF SUMMARY OF THE INVENTION

The present invention pertains to a method for manufacturing a multi-part component so that it dampens vibration and noise when it is subject to forces. In particular, in one embodiment, a first part is pre-stamped for use in the component. The part is then prepared for application of a resilient or elastic material, such as a thermoset oil resistant material. In one embodiment, a polyacrylate (ACM)-based compound is used.

The resilient material is strategically or selectively applied to the first part so that areas requiring additional dampening, such as by the perimeter and areas by a rib, have additional dampening. As a result, the resilient material is added where needed, providing a component that is not only less expensive to manufacture, but that is provided with greater dampening.

A second part is preferably pre-stamped and mechanically attached to the first part. The second part can be mechanically attached in a number of ways, including, for example, welding, crimping or stacking the second part onto the first part. The entire component is then cured so that as the resilient material is cured, the solvent evaporates and the parts are bonded together.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
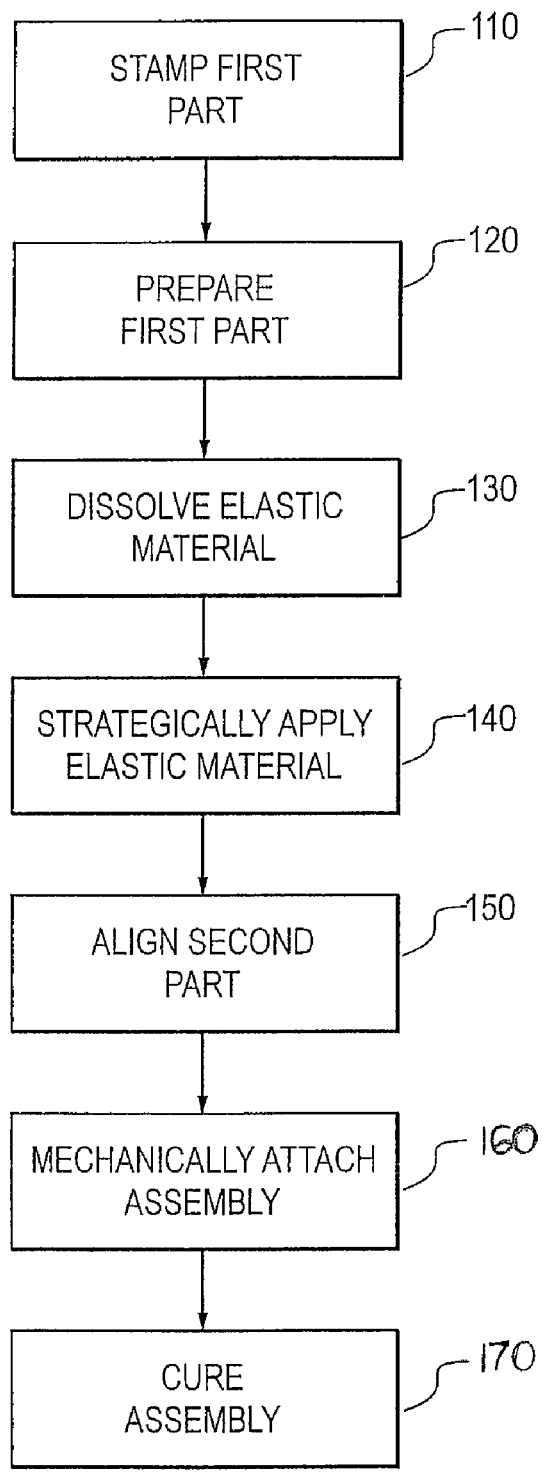
FIG. 1 is a block diagram of one embodiment of a method of making a reduced vibration and noise susceptible assembly in accordance with the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

An embodiment of the present invention pertains to an improved method for manufacturing multi-part components that can dampen vibration and noise caused by exposure to forces. In particular, a first part is pre-stamped and treated for application by a resilient or elastic material, and the material is selectively or strategically applied to the first part. By strategically applying the material, additional dampening and rigidity is provided in those areas that require it and the material is not applied where not needed. A second part is mechanically attached to the first part, and the component is cured. The component is thus manufactured at a lower cost (due to less material and waste) and provides improved dampening.

FIG. 1 shows a block diagram of one method of the invention. At step 110, a first part 10 is stamped into a desired shape. For example, in the embodiment of FIG. 2a, the first part 10 is a metal sheet. At step 120, the first part 10 is prepared for application of the elastic material 12. The first part 10 can be prepared by, for example, cleaning the part and preparing it for adhesion, such as by plasma etching, conversion coating, e.g., iron phosphate coating, or grit blasting the part.

As shown in FIG. 1, at step 130, the elastic material is dissolved in a solvent, preferably a polar solvent, such as toluene or a co-solvent blend of toluene and methyl ethyl ketone (MEK). Because the elastic material 12 is relatively stiff in its natural form, it is dissolved in the solvent to facilitate application of the elastic material onto the first part 10.

The elastic material 12 is a suitable resilient material, such as rubber or an elastic like material that is selected based upon the component to which it will be applied. The elastic material is preferably a high strength, oil resistant thermoset elastomer. For example, when used in an oil pan assembly, a suitable material is a polyacrylate (ACM)-based compound often used as gasket material. As a result, the elastic material used in the invention desirably provides superior bonding and shear strength, while also being oil resistant.

Many presently known methods, on the other hand, incorporate a spongy thermoplastic material that is based on a urethane matrix between two metal sheets. The spongy material decomposes upon exposure to oil, resulting in leaks, and is not temperature resistant, which often results in the sheets becoming separated upon exposure to high temperatures. In addition, the spongy material has insufficient adhesion capabilities, which also leads to the sheets coming undone upon exposure to large vibrational forces.

At step 140, the elastic material 12 is strategically applied to the first part 10. The material 12 may be applied to the first part 10 in any number of ways, such as, by painting, spraying or pouring the material 12 onto the sheet 10. It has been found that a thin layer at a controlled thickness positioned in strategic areas of the component is the most desirable way to control vibration and noise. Specifically, the elastic material, which dampens the noise and vibration, is able to absorb forces caused by one of several sources, such as an engine, and still have sufficient bonding strength to hold the parts together.

Figure 2A:
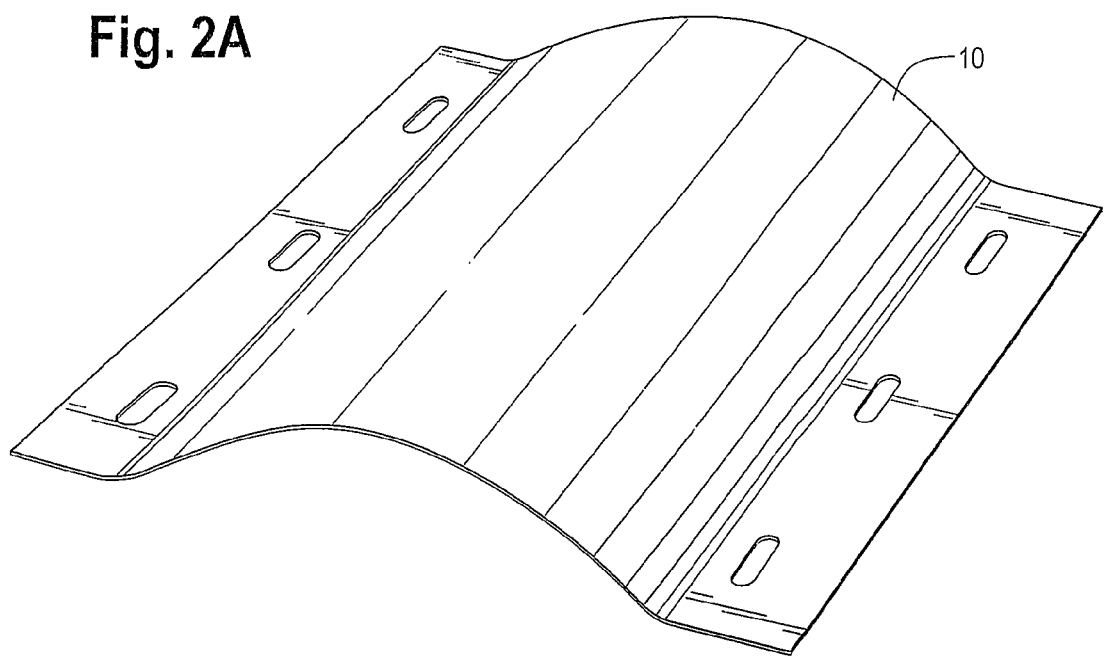
FIG. 2a is a isometric view of a first part of the invention.
Figure 2B:
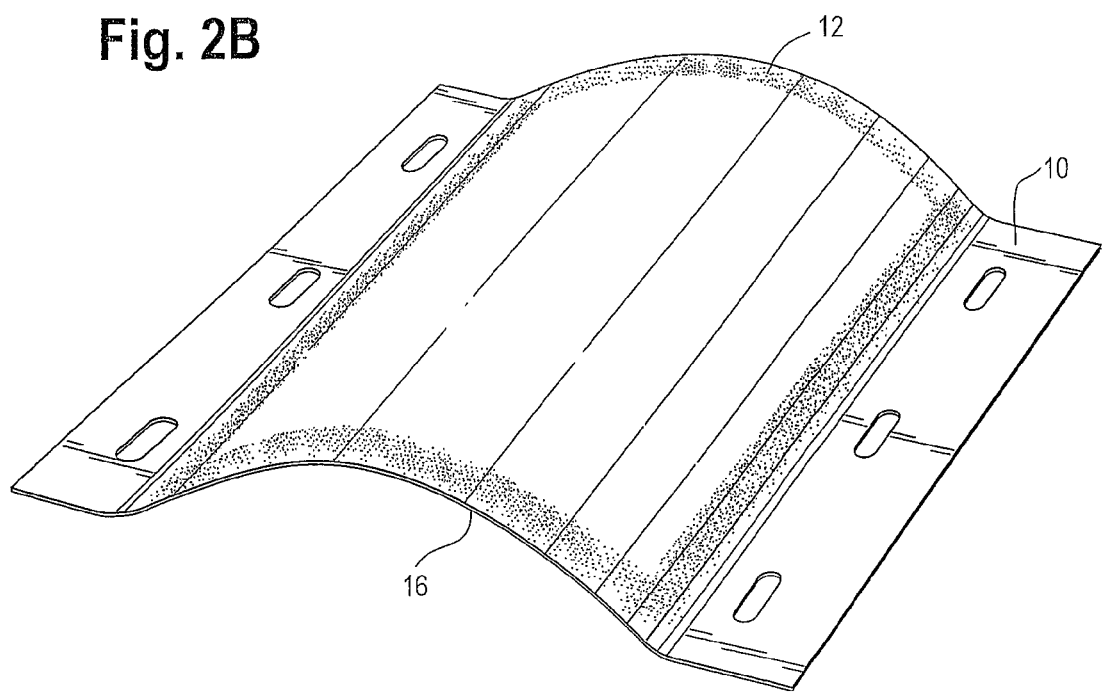
FIG. 2b is an isometric view of the first part of FIG. 2a with resilient material selectively applied thereto; and, FIG. 2c is an isometric view of a second part positioned onto the configuration shown in FIG. 2b.
Figure 2C:
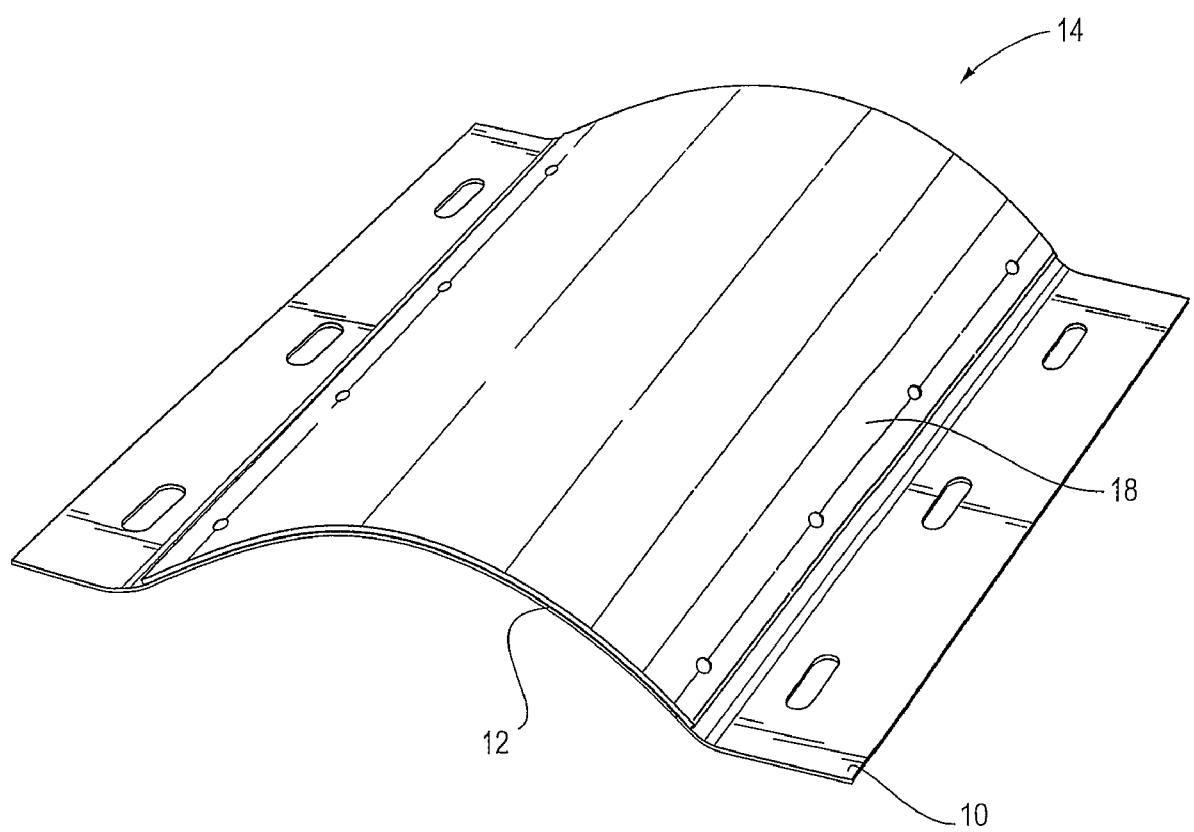

In the embodiment of FIGS. 2a-c, the material 12 is strategically applied to those areas of the sheet that are subject to the greatest forces and that will result in the greatest increase of component rigidity with the addition of elastic material. For example, in oil pan assemblies and many other components, the perimeter 16 of the component 14 is subject to the greatest forces because of the assembly's proximity to the engine and other sources of forces. As a result, more material 12 is added to areas where the component is subject to greater forces, e.g., at the perimeter 16. Also, in other components not shown, additional material may be added near ribs of the component to provide greater rigidity.

In presently known methods, on the other hand, a layer of rubber is uniformly added to a first metal sheet and a second metal sheet is placed atop the first sheet and rubber to produce a laminate metal sheet. The laminate sheet is then stamped into a desired shape. There is no control, however, over the positioning of the rubber nor the thickness of the rubber. As a result, there is inadequate rubber to dampen great forces in stress concentrated areas, such as by the perimeter in oil pan assemblies, and too much rubber where it is not needed. Further, because the laminate sheet is stamped after the rubber has been added, material wastage, e.g., the cut out metal and rubber, results.

Thus, the present method provides a flexible method that efficiently dampens noise and vibration by having elastic material selectively applied, in terms of location and amount of material. The added flexibility allows for a more secure component 14 that can better dampen vibration and noise.

At step 150, the second part 18 is aligned with the first part 10, as shown in FIGS. 1 and 2c. The second part 18 cooperates with the first part 10 and is preferably pre-stamped so that its design is similar to the shape of the first part. At step 160, the parts are mechanically attached together.

In presently known methods, first and second metal sheets include holes or slots formed therein and a rubber material protrudes through the holes or slots to ensure continuous connection of the sheets and rubber. But, the rubber often decomposes, especially upon exposure to oil, resulting in undesirable oil leaks. The mechanical attachment methods of one embodiment of the invention, conversely, incorporate mechanical attachment methods that do not incorporate openings, relieving them of the leakage problems that known methods are exposed to. For example, the parts can be crimped, welded or stacked together to ensure that the layers do not disconnect over time.

At step 170, the first and second parts 10, 18 and the elastic material 12 are cured together. In one embodiment, the parts 10, 18 and elastic material 12 are heated, preferably in a mold or an oven, so that the elastic material is cured, the solvent is evaporated and the parts are bonded together.

All patents referred to herein, are hereby incorporated herein by reference, whether or not specifically do so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be made to the invention without departing from the true spirit and scope of the novel concepts of the present invention. It is to be understood that no limitation with respect to the specific embodiments illustrated is intended or to be inferred. The disclosure is intended to cover all such modifications as fall within the scope of the invention, including, for example, machines that incorporate feeding and rewinding assemblies, print engines, tamp pad movement assemblies and tamp pad mechanisms to secure a label to the tamp pad that differ from those shown and described above.

What is claimed is:

1. A method for manufacturing multi-part components for an assembly subject to vibrational forces, the assembly comprising first and second metal parts attached together of stamped metal sheets, an elastomeric resilient material positioned between the two stamped metal sheets, the method comprising:

stamping a first metal sheet into a shape to form the first metal part;

selectively applying a thermoset oil resistant elastomeric resilient material comprising a polyacrylate (ACM)—based compound to the first metal part so that areas of the first metal part that are exposed to greater forces than other areas of the metal part that are subject to less forces have more resilient material applied thereon than other areas subject to less forces, stamping a second metal sheet into a shape to form the second metal part, wherein the shape of the second metal part forms a mating plate placed over the thermoset oil-resistant elastomeric material selectively applied to the first metal part;

aligning the second metal part over the elastomeric material applied to the first metal part and over the first metal part, the second metal part having a design for mating to the shape of the first part so that the second part cooperates with the first part;

mechanically attaching and locking the two parts and resilient material together to form a composite assembly that dampens vibration and noises when subject to forces; and curing the first and second metal parts and the resilient material to one another by application of heat to manufacture the multi-part component assembly.

2. The manufacturing method of claim 1, further including the step of preparing the first metal part for resilient material application by cleaning the part for adhesion of resilient material.

3. The manufacturing method of claim 2, wherein the preparing step further includes plasma etching, conversion coating of iron phosphate coating or grit blasting the first metal part.

4. The manufacturing method of claim 1, wherein the selectively applying step further includes applying an oil resistant thermoset elastomer dissolved in a polar solvent.

5. The manufacturing method of claim 1, wherein the curing step includes heating the first and second parts and the resilient material to cure the resilient material and bond the first and second parts to one another in a mold or oven.

6. The manufacturing method of claim 1, wherein the mechanically locking step includes crimping, welding or stacking the two parts and the resilient material together.

7. The manufacturing method of claim 1, wherein the selectively applying step further includes applying the resilient material around a perimeter area and close to ribs formed in the first part where the second part will be aligned with the first part and not applying material on other areas of the first part including the edges of the first part.

* * * * *